United States Patent
Lee et al.

(10) Patent No.: US 8,296,506 B2
(45) Date of Patent: Oct. 23, 2012

(54) METHOD FOR MANAGING A NON-VIOLATE MEMORY AND COMPUTER READABLE MEDIUM THEREOF

(75) Inventors: Tsung-Hsi Lee, Tainan (TW); Wen-Jun Zeng, Keelung (TW); Chung-Ning Huang, Hsinchu (TW); Shin-Hui Huang, Rende Township, Tainan County (TW)

(73) Assignee: Lite-On It Corporation, Taipei (TW)

( * ) Notice: Subject to any disclaimer, the term of this patent is extended or adjusted under 35 U.S.C. 154(b) by 493 days.

(21) Appl. No.: 12/614,544

(22) Filed: Nov. 9, 2009

(65) Prior Publication Data

US 2011/0113183 A1     May 12, 2011

(51) Int. Cl.
*G06F 12/10* (2006.01)

(52) U.S. Cl. ............. 711/103; 711/206; 711/E12.008; 711/E12.014

(58) Field of Classification Search .................. None
See application file for complete search history.

(56) References Cited

U.S. PATENT DOCUMENTS

| | | | |
|---|---|---|---|
| 6,347,355 B1 * | 2/2002 | Kondo et al. ................. | 711/103 |
| 6,510,488 B2 * | 1/2003 | Lasser ........................ | 711/103 |
| 7,127,551 B2 | 10/2006 | Beck | |
| 2003/0101327 A1 * | 5/2003 | Beck ............................ | 711/206 |
| 2005/0182892 A1 * | 8/2005 | Nakanishi et al. ............ | 711/103 |
| 2006/0205357 A1 * | 9/2006 | Kim ............................ | 455/69 |
| 2006/0253645 A1 * | 11/2006 | Lasser .......................... | 711/103 |
| 2007/0005928 A1 * | 1/2007 | Trika et al. .................. | 711/202 |
| 2007/0168698 A1 * | 7/2007 | Coulson et al. ................ | 714/5 |
| 2010/0169549 A1 * | 7/2010 | Yano et al. .................... | 711/103 |

FOREIGN PATENT DOCUMENTS

| | | | |
|---|---|---|---|
| JP | 2005222202 A | * | 8/2005 |
| JP | 2008012853 A | * | 1/2008 |

* cited by examiner

*Primary Examiner* — Michael Krofcheck
(74) *Attorney, Agent, or Firm* — Thomas|Kayden (57) ABSTRACT

A method for managing a non-volatile memory is provided. The non-volatile memory has a number of blocks, and each block has a number of sub-blocks. The method includes a number of steps. First, a last physical address is obtained. The last physical address corresponds to a sub-block which is close to another sub-block where data is newly stored. Next, it is determined, for each sub-block of at least one block, the validity of data being stored. The at least one block is at least one neighboring block of a block containing the corresponding sub-block of the last physical address. Then, a mapping table is produced according to the step of determining the validity of data.

13 Claims, 7 Drawing Sheets

FIG. 9

METHOD FOR MANAGING A NON-VIOLATE MEMORY AND COMPUTER READABLE MEDIUM THEREOF

TECHNICAL FIELD

The application relates in general to a method for managing a memory and computer readable medium thereof, and more particularly to a method for managing a non-volatile memory and computer readable medium thereof.

BACKGROUND

Recently, information storage devices based on a non-volatile memory, such as a flash memory, have been widely applied to computer platforms and portable devices. Such a device is regarded as a substitute for an information storage device based on magnetic disk memory, serving as a storage medium of a computer for storing operating systems and data files.

A flash memory differs with a magnetic disk memory in that the magnetic disk memory has the ability of random data access. In order to overwrite data in the flash memory, existing data must be deleted first. In other words, as for a flash memory having a number of memory cells, the memory cells should be returned to an initial state by erasing data stored therein. Besides, in order to modify data stored in a memory cell, a number of steps are required, such as the steps of reading the stored data in the memory cell, modifying the read data, and writing the modified data in an empty memory cell of the flash memory.

Due to the above mentioned characteristics, a mapping table is usually used to manage the flash memory. The mapping table can be referred to as a table that associates a logical address with a physical address. In practice, the logical address requested to read or write is changed into a physical address with reference to the mapping table, and data in the corresponding physical address of the flash memory is read or written. However, the mapping table may result in incorrect data access when power of the flash memory is suddenly cut-off. In other words, mapping table may fail in correctly associating the logical address with the physical address in the event of power failure or improper behaviors to power off the flash memory, thereby lowering the stability of the information storage device based on a flash memory.

There is provided an approach to enhance the stability for the flash memory, in which a mapping table is produced and corrected by scanning the entire flash memory when an information storage device based on the flash memory is booted. This approach, however, consumes lots of time in scanning the entire the flash memory, thereby reducing the efficiency of managing the flash memory. Therefore, it is a subject of the industrial endeavors to manage the flash memory with high efficiency and stability.

BRIEF SUMMARY

Embodiments being provided are directed to a method for managing a non-volatile memory and computer readable medium thereof, which produces a mapping table by determining the validity of data for partial blocks of the non-volatile memory, thereby increasing the efficiency of managing the non-volatile memory and enhancing stability for the non-volatile memory. Therefore, the data stored in the non-volatile memory can be accessed correctly even in the event of power failure or an improper behavior to power off the non-volatile memory.

An exemplary embodiment of a method for managing a non-volatile memory is provided. The non-volatile memory has a number of blocks, and each block has a number of sub-blocks. The method includes a number of steps. First, a last physical address is obtained. The last physical address corresponds to a sub-block which is close to another sub-block where data is newly stored. Next, it is determined, for each sub-block of at least one block, the validity of data being stored. The at least one block is at least one neighboring block of a block which contains the corresponding sub-block of the last physical address. Then, a mapping table is produced according to the step of determining the validity of data.

Another exemplary embodiment of a computer readable medium having computer executable data is provided. The computer executable data comprises executing codes and when executed by an electronic device, causes the electronic device to perform the method for managing a non-volatile memory mentioned above.

It is to be understood that both the foregoing general description and the following detailed description are exemplary and explanatory only and are not restrictive of the disclosed embodiments, as claimed.

DETAILED DESCRIPTION

Embodiments of this application provide a method for managing a non-volatile memory, in which a mapping table is produced by determining the validity of data for partial blocks of the non-volatile memory. As compared to a conventional approach which produces the mapping table by scanning the entire memory, the present method for managing the non-volatile memory is capable of increasing the efficiency of managing the non-volatile memory while enhancing stability for the non-volatile memory. Therefore, the present method allows the data stored in the non-volatile memory to be accessed correctly even in the event of power failure or an improper behavior to power off the non-volatile memory.

Figure 1:
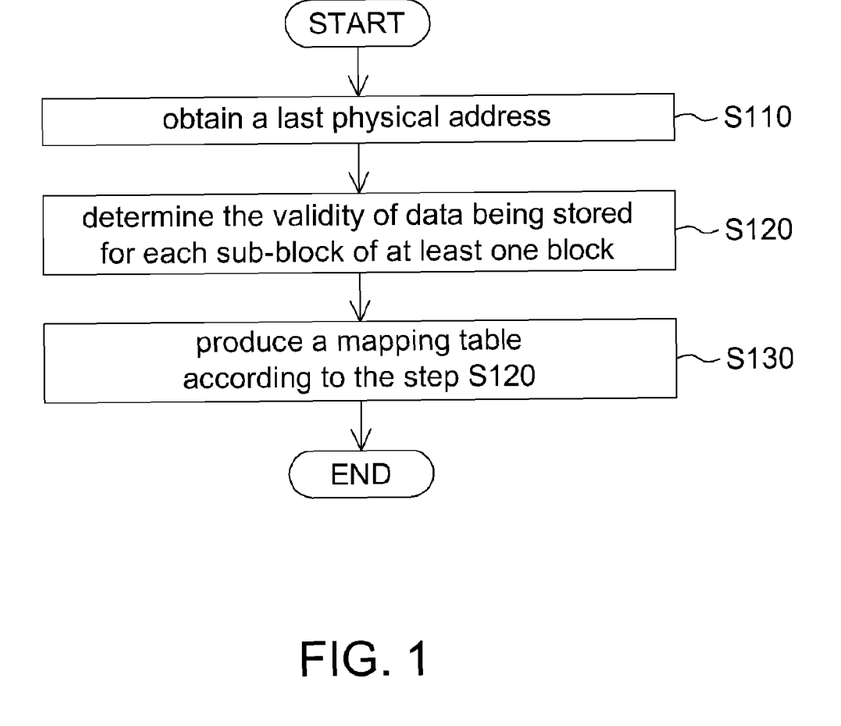
FIG. 1 is a flow chart showing a method for managing a non-volatile memory according to an exemplary embodiment.

FIG. 1 is a flow chart showing a method for managing a non-volatile memory according to an embodiment of this application. The non-volatile memory has a number of blocks, and each block has a number of sub-blocks. Referring to FIG. 1, the method includes a number of steps as being exemplified in the following. First, in step S110, a last physical address is obtained. The last physical address corresponds to a sub-block which is close to another sub-block where data is newly stored. Next, in step S120, for each sub-block of at least one block, the validity of data being stored is determined. The at least one block is at least one neighboring block of a block which contains the corresponding sub-block of the last physical address. Then, in step S130, a mapping table is produced according to the step S120 of determining the validity of data. An exemplary embodiment is provided below with reference to FIGS. 2 and 3 for the sake of illustrating the method for managing the non-volatile memory in FIG. 1.

Figure 2:
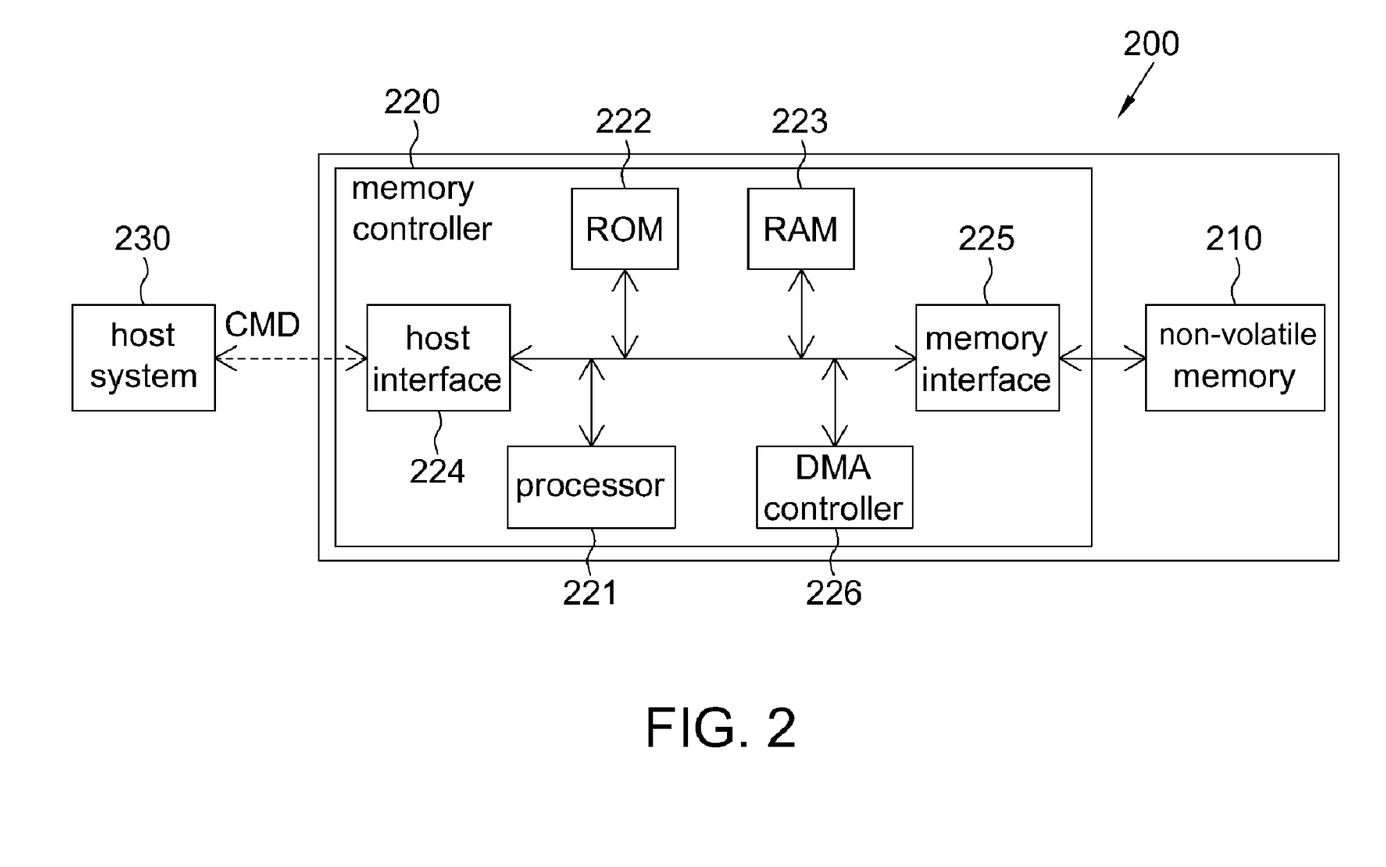
FIG. 2 is a block diagram showing a non-volatile memory system which applies the method for managing the non-volatile memory according to an exemplary embodiment.

FIG. 2 is a block diagram showing a non-volatile memory system which applies the method for managing the non-volatile memory according to an exemplary embodiment. The non-volatile memory system 200 includes a non-volatile memory 210 and a memory controller 220. The memory controller 220 includes, for example, a processor 221, a read only memory (ROM) 222, a random access memory (RAM) 223, a host interface 224, and a memory interface 225. The ROM 222 stores computer executing codes such as program codes for use in the processor 221. The RAM 223, in the exemplary embodiment, can be implemented as a dynamic random access memory (DRAM), a static random access memory (SRAM), or an equivalent substitute which is known to those of ordinary skill in the art. The host interface 224 is configured to be connected to a host system 230, so as to receive power and commands CMD. The memory interface 225 is connected to the non-volatile memory 210, allowing the processor 221 to manage the non-volatile memory 210. The processor 221 executes the computer executing codes stored in the ROM 222, and sends commands for the RAM 223 and the non-volatile memory 210, so as to perform the method for managing the non-volatile memory according to the embodiments of the application.

Figure 3:
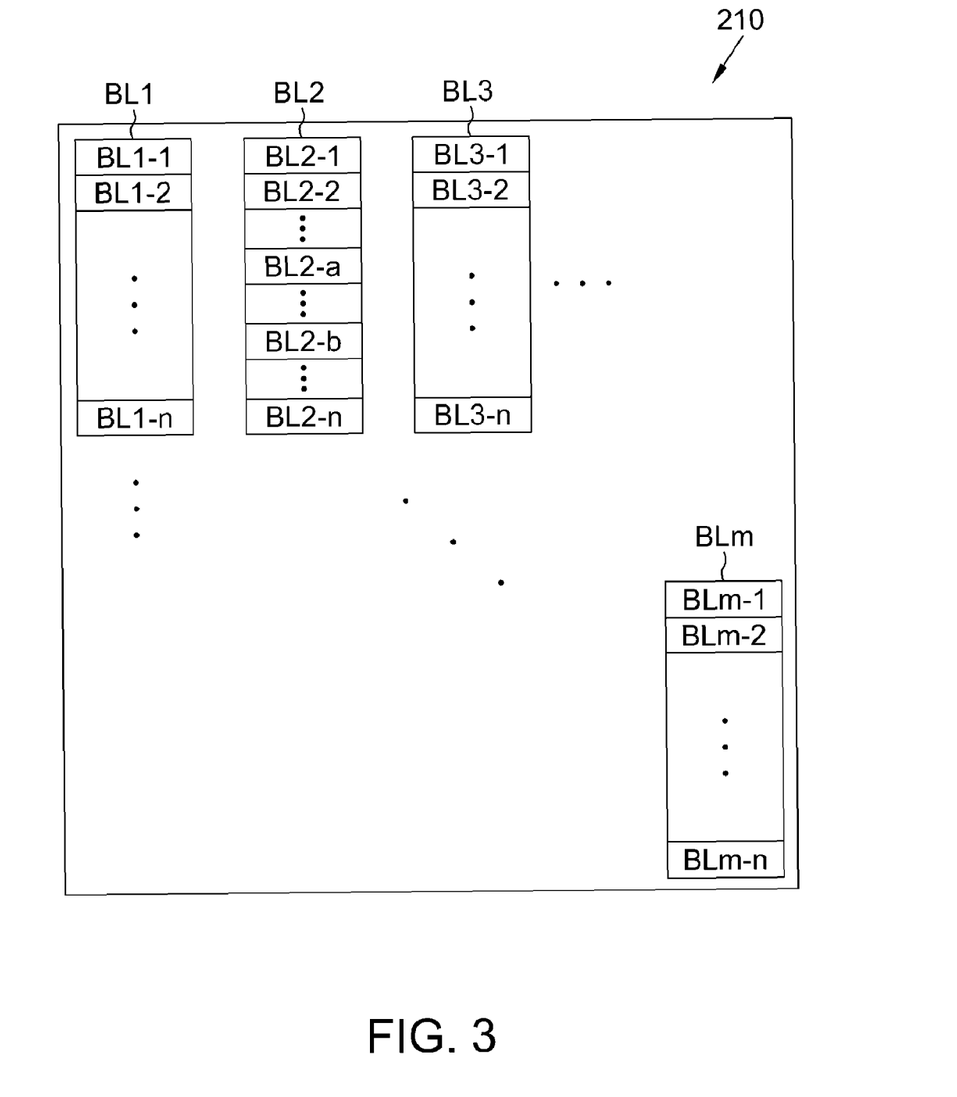
FIG. 3 is a schematic diagram showing an example of the structure of the non-volatile memory in FIG. 2.

FIG. 3 is a schematic diagram showing an example of the structure of the non-volatile memory in FIG. 2. The non-volatile non-volatile memory 210 is, for example but non-limitedly, a flash memory or an equivalent. The non-volatile memory 210 has a number of blocks BL1 to BLm, and each block has a number of sub-blocks which are also referred to as pages in practice. Each sub-block corresponds to a physical address of the non-volatile memory 210, serving as a basic memory unit for storing data. As an example, the processor 221 can access data stored in one of sub-blocks BL2-1 to BL2-$n$ of the block BL2 according to a corresponding physical address thereof. The physical address is, for example, converted from a logical address contained in a command for controlling the non-volatile memory with reference to a mapping table, which is further detailed later in the specification.

Refer to FIGS. 1 to 3 for further illustration. First, as shown in the step S110, the processor 221 obtains a last physical address, which corresponds, for example, to a sub-block BL2-$a$ of the block BL2. The sub-block BL2-$a$ is close to another sub-block where data is newly stored, such as a sub-block BL2-$b$ of the same block BL2 as shown in FIG. 3, or a sub-block of another block which is so close to the block BL2 that the processor 221 can identify it by scanning neighboring blocks of the block BL2. It is assumed in this embodiment that the sub-block where data is newly stored is the sub-block BL2-$b$, but this embodiment is not limited thereto.

Next, as shown in the step S120, the processor 221 determines the validity of stored data for each sub-block of at least one block. The at least one block can be at least one neighboring block of the block BL2 containing the sub-block BL2, such as the blocks BL1 to BL3. The processor 221 scans the at least one block, such as the blocks BL1 to BL3, and determines the validity of data being stored therein. The step S120 is performed to identify those data being determined as invalid, thereby enhancing stability for the non-volatile memory. Then, as shown in the step S130, the processor 221 produces a mapping table according to the step S120 of determining the validity of data.

In response to a previous command for writing the non-volatile memory 210, the processor 221 may store incomplete data in some sub-blocks which is regarded as being invalid when an abnormal event is triggered. A triggering of the abnormal event means that power failure is occurred, or an improper behavior to power off the non-volatile memory is conducted, such as a behavior which a user conducts to remove the non-volatile memory from the host system without requesting a command in advance. As such, when the non-volatile memory system 200 is booted thereafter, the processor 221 can utilize the last physical address which is stored prior to the abnormal event to scan the neighboring blocks of the corresponding block, so as to identify the most possible place where invalid data might be stored. In this way, the non-volatile memory system 200 can produce the mapping table by scanning partial blocks of the non-volatile memory 210 instead of scanning the entire non-volatile memory 210, thereby increasing the efficiency of managing the non-volatile memory 210 while enhancing stability for the non-volatile memory 210. Moreover, because the mapping table is produced according to the valid data stored in the non-volatile memory 210, the non-volatile memory system 200 are assured to utilize the mapping table to correctly associate a logical address with a corresponding physical address. Therefore, the present embodiment allows the data stored in the non violate non-volatile memory 210 to be accessed correctly even in the event of power failure or an improper behavior to power off the non-volatile memory 210.

Figure 4:
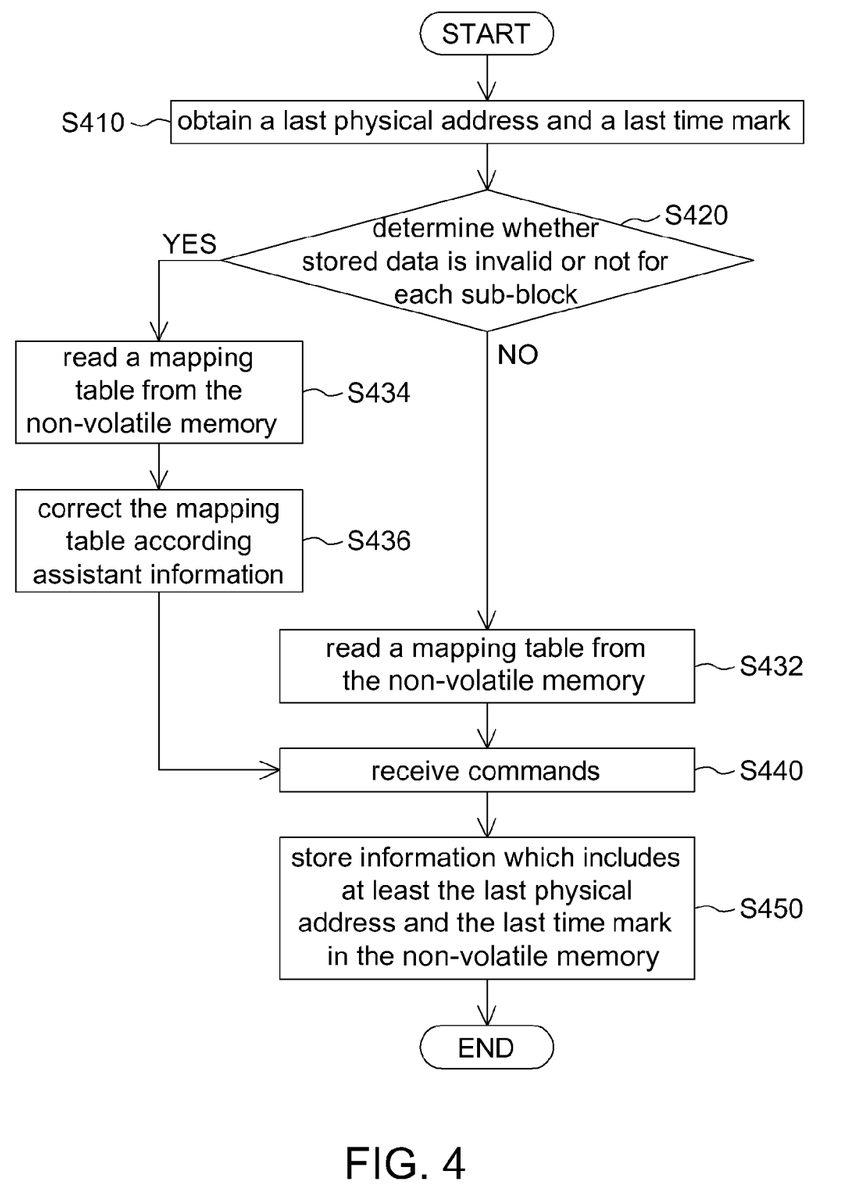
FIG. 4 is a detailed flow chart showing an example of the steps of the method for managing the non-volatile memory in FIG. 1.
Figure 5:
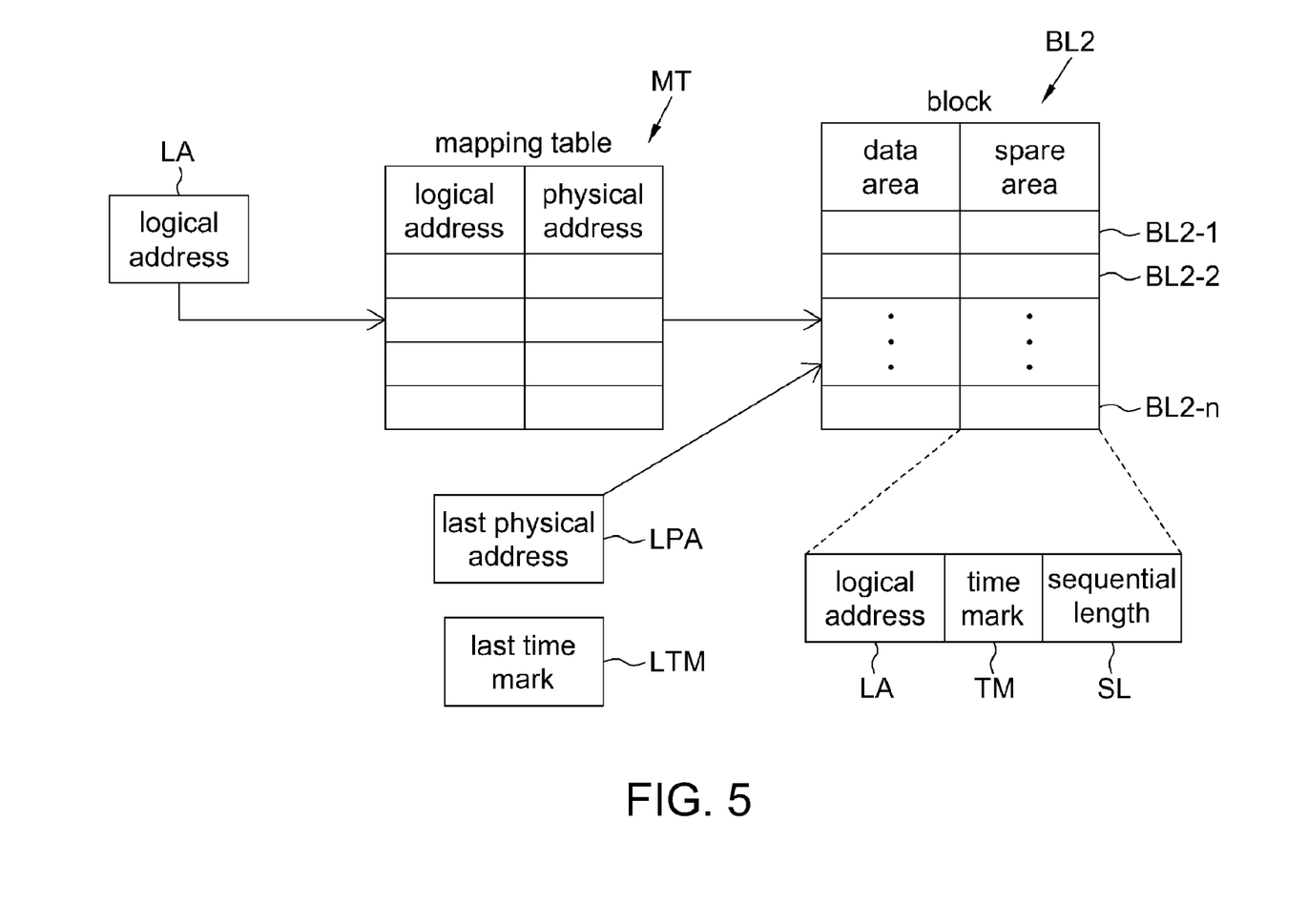
FIG. 5 is a schematic diagram showing detailed configuration views of a mapping table and a number of sub-blocks of the non-volatile memory according to an exemplary embodiment.

The steps S120 and S130 shown in FIG. 1 are further described with reference to FIGS. 2, 4 and 5 below for illustration. FIG. 4 is a detailed flow chart showing an example of the steps of the method for managing the non-volatile memory 210 in FIG. 1. FIG. 5 is a schematic diagram showing detailed configuration views of a mapping table and a number of sub-blocks of the non-volatile memory 210 according to an exemplary embodiment.

As shown in FIG. 5, a mapping table MT that associates a logical address LA with a physical address PA is previously stored in the non-volatile memory 210 before the non-volatile memory system 200 is booted. When the non-volatile memory system 200 is booted, the method starts from step S410, in which the processor 221 obtains a last physical address LPA. Next, in step S420, the processor 221 determines whether stored data is invalid or not for each sub-block of the mentioned at least one block. The illustrated in FIG. 5 is the sub-blocks BL2-1 to BL2-$n$ of the block BL2, which contain the corresponding sub-block of the last physical address LPA.

Specifically, as shown in FIG. 5, each of the sub-blocks BL2-1 to BL2-$n$ includes a data area and a spare area. The data area is for storing data, and the spare area is for storing information relative to the stored data in the corresponding data area, such as error correction codes (ECC) for the stored data. Those spaces of the spare area which are not occupied by ECC can be used to store assistant information, while the assistant information can be used to determine the validity of stored data in the corresponding data area. In an exemplary embodiment described later in the specification, for the sub-blocks BL2-1 to BL2-$n$, when the processor 221 executes the step S420 of determining whether the stored data is invalid or not, the processor 221 scans the assistant information being stored in the corresponding spare area, and determines the validity of data being stored in the corresponding data area according to the assistant information.

For example, the assistant information being stored includes at least one of a logical address LA, a time mark TM, and a sequential length SL. As for each sub-block, the logical address LA is converted to the corresponding physical address PA with reference to the mapping table MT, and is stored in the spare area of the corresponding sub-block of the physical address PA. The time mark TM indicates the order of data being stored in the corresponding data area. In other words, the time mark TM indicates the time at which a command is requested to write data to the corresponding data area. The sequential length SL indicates the length of data being sequentially stored in a portion of sub-blocks. In practice, when a command for sequentially writing data to the non-volatile memory 210 is received, such as a direct memory access (DMA) command for sequentially writing data to a sequence of sub-blocks, identical assistant information will be stored in the corresponding spare areas of the sub-blocks.

Figure 6:
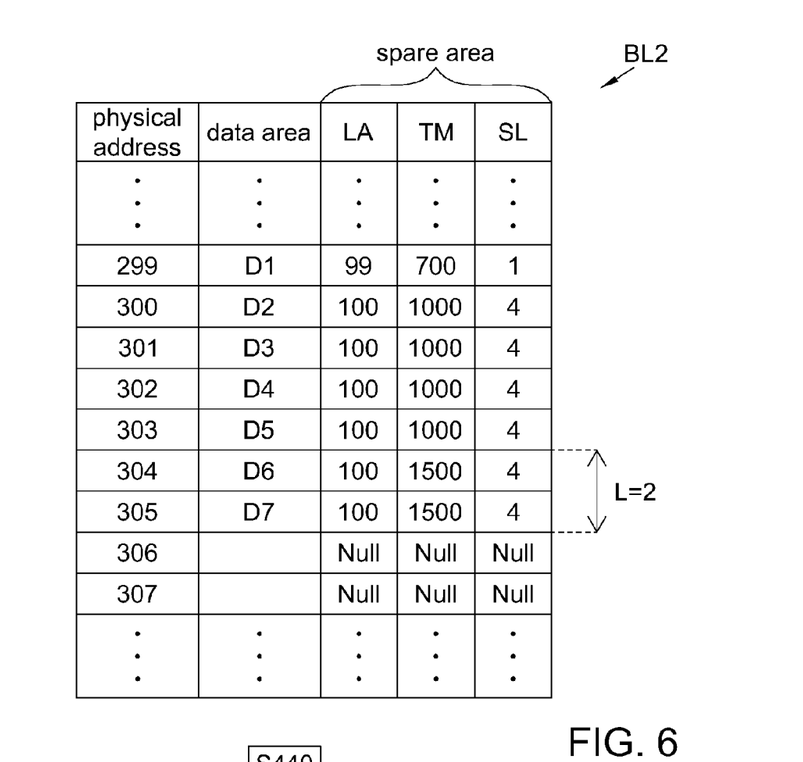
FIG. 6 is a schematic diagram showing an example of determining the validity of stored data according to at least one of the address, the time mark, and the sequential length stored in the corresponding spare area.

In an exemplary embodiment, the validity of stored data is determined according to at least one of the logical address LA, the time mark TM, and the sequential length SL, which is shown in FIG. 6. FIG. 6 is a schematic diagram showing an example of determining the validity of stored data according to at least one of the address, the time mark, and the sequential length stored in the corresponding spare area. In this example, a number of data D1 to D7 were stored in the block BL2 of the non-volatile memory 210 before the non-volatile memory system 200 is booted. As shown in FIG. 6, according to a command containing a logical address of 99 and a length of 1, a piece of data D1 was stored in a corresponding data area of physical address of 299. Subsequently, according to a command containing a logical address of 100 and a sequential length of 4, such as a DMA command, a sequence of data D2 to D5 were stored in corresponding data areas of physical addresses of 300 to 303 by a DMA controller 226 of the non-volatile memory system 200. Due to the characteristic of the DMA command, identical assistant information including a logical address of 100, a time mark of 1000, and a sequential length of 4 were stored in the corresponding spare areas of physical addresses of 300 to 303. Moreover, assume that another command containing the logical address of 100 and the sequential length (SL) of 4 was received subsequently. At this time, however, power failure is occurred during the processor 221 sequentially writes four pieces of data to the block BL2 of the non-volatile memory 210, causing the processor 221 stored incomplete data in corresponding sub-blocks of the physical address of 304 and 305, such as two pieces of data D6 and D7.

In this embodiment, when the processor 221 performs the step S420, it scans the assistant information to identify a sequence of sub-blocks in which identical assistant information are stored. In this way, the processor 221 can identify the two sub-blocks of the physical addresses of 304 and 305, in which identical assistant information including logical addresses of 100, time marks of 1500, and sequential lengths of 4 are stored. Next, for the two sub-blocks of the physical addresses of 304 and 305, the processor 221 determines the validity of data by comparing a length L of the two sub-blocks, which equals to 2, and the sequential length of 4, which is stored in one of the corresponding spare areas thereof. Because the sequential length SL is larger than the length L of the two sub-blocks (i.e., 4>2), the processor 221 determines the data being stored in the sub-blocks of the physical addresses of 304 and 305 as invalid.

In another exemplary embodiment, the validity of stored data is determined according to a last time mark LTM and the time mark TM as shown in FIG. 5. The last time mark LTM is obtained before the step S420, such as in the step S410. The last time mark LTM indicates the order of data being stored in the corresponding sub-block of the last physical address LPA. In this embodiment, when the processor 221 performs the step S420, it determines the validity of data stored in the corresponding data area by comparing the last time mark LTM and the time mark TM and for each sub-block of the block BL2. If any time mark is larger than the last time mark, which may indicate that power failure is occurred during a previous operation of the non-volatile memory 210, so that the processor 221 determines the data being stored in those sub-blocks with larger time marks as invalid.

After the step S420 of determining the validity of data, if the stored data of each sub-block is determined as valid, the method proceeds to step S432. In the step S432, the processor 221 reads the mapping table 600 from the non-volatile memory 210, regarding the mapping table 600 as a correct one that associates a logical address with a physical address for the non-volatile memory 210. On the other hand, if the stored data of each sub-block is determined as invalid in the step S420, the method proceeds to steps S434 and S436. In the step S434, the processor 221 reads the mapping table 600 from the non-volatile memory 210. In the step S436, the processor 221 corrects the mapping table according the assistant information, so as to produce a correct mapping table that associates a logical address with a physical address for the non-volatile memory 210. Therefore, the data stored in the non-volatile memory 210 can be accessed correctly according to the correct mapping table.

Next, the method enters step S440, in which the processor 221 receives commands CMD requested from the host system 230. The commands CMD can be request to read, write, or any one known to those of ordinary skill in the art. After that, in step S450, the processor 221 stores the last physical address LPA in the non-volatile memory 210. As for the embodiment utilizing the last time mark LTM, when the last physical address LPA is stored in the step S450, the last time mark LTM is also stored, as shown in the step S450.

Figure 7:
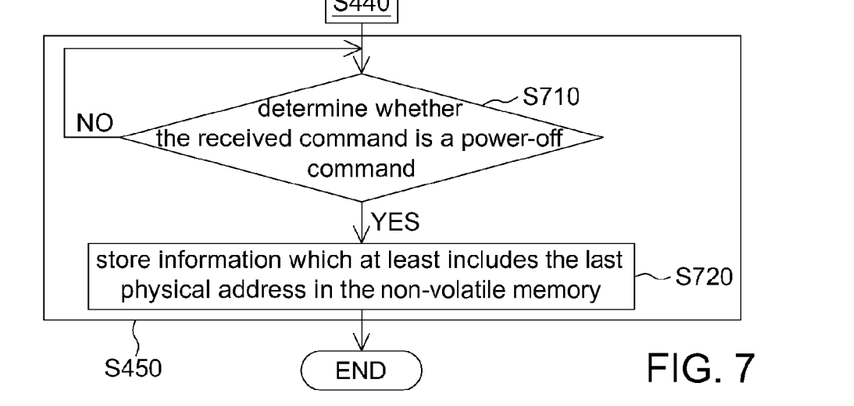
FIG. 7 to FIG. 9 are detailed flow charts each showing an example of the step S450 of the method for managing the non-volatile memory in FIG. 4.
Figure 8:
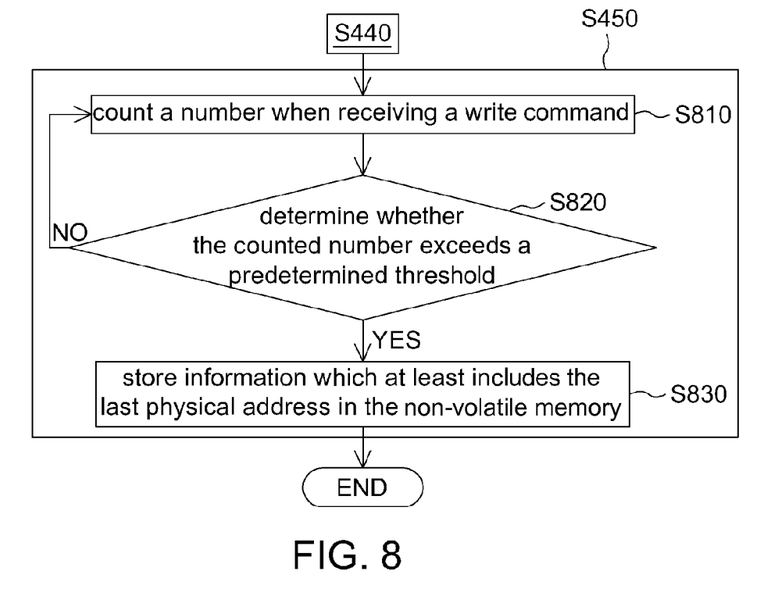
Figure 9:
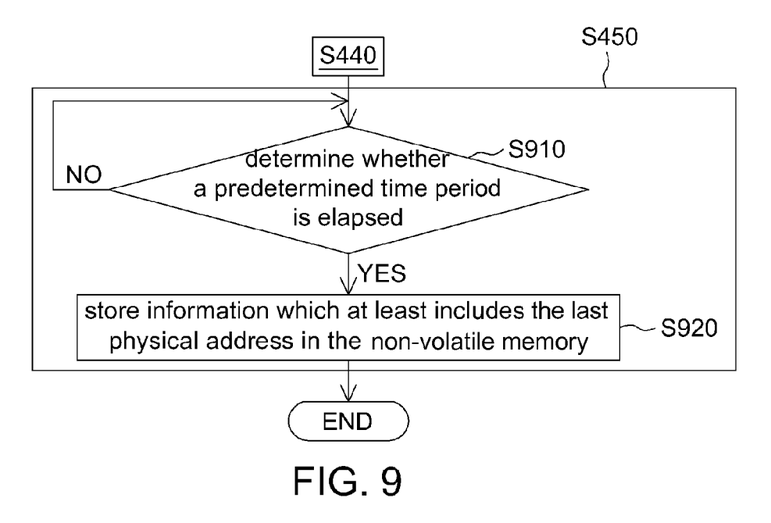

FIGS. 7 to 9 are detailed flow charts each showing an example of the step S450 of the method for managing the non-volatile memory 210 in FIG. 4. As shown in a first example of FIG. 7, the step S450 includes two sub-steps S710 and S720. In the sub-step S710, the processor 221 determines whether the received command, e.g. from the host system 230, is a command for powering off the non-volatile memory 210. Then, in the sub-step S720, the processor 221 can store information which at least includes the last physical address LPA in the non-volatile memory 210 when the sub-step S710 is determined as positive, i.e., the processor 221 receives the command for powering off the non-volatile memory 210. As shown in a second example of FIG. 8, the step S450 includes three sub-steps S810, S820, and S830. In the sub-step S810, the processor 221 can count a number when receiving a command for writing the non-volatile memory 210. Then, in the sub-step S820, the processor 221 determines whether the counted number exceeds a predetermined threshold. Next, in the sub-step S830, the processor 221 can store information which at least includes the last physical address LPA in the non-volatile memory 210 when the sub-step S820 is determined as positive, i.e., the counted number exceeds the predetermined threshold. As shown in a third example of FIG. 9, the step S450 includes two sub-steps S910 and S920. In the third example, the processor 221 can store information which at least includes the last physical address LPA in the non-volatile memory 210 periodically, e.g., the last physical address LPA is stored every one predetermined time period. Specifically, in the sub-step S910, the processor 221 determines whether a predetermined time period is elapsed. Then, in the sub-step S920, the processor 221 can store information which at least includes the last physical address LPA in the non-volatile memory 210 when the sub-step S910 is determined as positive. However, the method for managing the non-volatile memory 210 present in the embodiment is not limited to the exemplary examples. Any approach to store, in the non-volatile memory 210, a physical address which is for use in identifying sub-block where data is newly stored can be regarded as a practicable embodiment of the application.

Besides, an embodiment of a computer readable medium having computer executable data is further provided, which comprises executing codes and when executed by an electronic device, causes the electronic device to perform the method for managing a non-volatile. The computer readable medium of this embodiment includes, for example but non-limitedly, an optical information storage medium or a magnetic information storage medium. The optical information storage medium may be CD, DVD, HD-DVD, blue-ray DVD or the like. The magnetic information storage medium may be a floppy disk drive, a hard disk drive, a magnetic tape drive, a magnetic optical drive or the like. In addition, the computer readable medium also includes program codes that can be transferred through the network/transmission media (e.g., the air).

According to the present embodiments of the application, a method for managing a non-volatile memory and computer readable medium thereof can produce a mapping table by determining the validity of data for partial blocks of the non-volatile memory 210, thereby increasing the efficiency of managing the non-volatile memory 210 and enhancing stability for the non-volatile memory 210. Therefore, the data stored in the non-volatile memory 210 can be accessed correctly even in the event of power failure or an improper behavior to power off the non-volatile memory 210.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method for managing a non-volatile memory, the non-volatile memory having a plurality of blocks, each block having a plurality of sub-blocks, each sub-block having a data area and a spare area, the method comprising the steps of:
    obtaining a last physical address, the last physical address corresponding to a first sub-block which is adjacent to a second sub-block where data is latest stored, wherein a first block has the first sub-block;
    determining the validity of data being stored in each sub-block of at least one block, the at least one block comprising at least one block of the first block and the neighboring blocks of the first block, comprising the steps of:
        scanning an assistant information being stored in the corresponding spare area to identify a sequence of sub-blocks in which identical assistant information are stored, wherein the assistant information is stored when a command for sequentially writing the non-volatile memory is received and the assistant information of each sub-block comprises a sequential length indicating the length of data being sequentially stored in a portion of sub-blocks; and
        determining the validity of data being stored in the corresponding data area by comparing a length of the sequence of sub-blocks and the sequential length which is stored in one of the corresponding spare areas; and
    producing a mapping table according to the step of determining the validity of data.

2. The method for managing the non-volatile memory according to claim 1, wherein the assistant information of each sub-block comprises a time mark, the time mark indicates the order of data being stored in each sub-block, and the method further comprises the step of:
    obtaining a last time mark, the last time mark indicating the order of data being stored in the first sub-block of the last physical address;
    wherein the step of determining the validity of data comprises:
        for each sub-block of the at least one block, determining the validity of data stored in the corresponding data area by comparing the last time mark and the time mark.

3. The method for managing the non-volatile memory according to claim 1,
    wherein the last physical address is stored in the non-volatile memory when a command for powering off the non-volatile memory is received so that the last physical address can be obtained after the non-volatile memory is powering on.

4. The method for managing the non-volatile memory according to claim 1,
    wherein a number is counted when a command for writing the non-volatile memory is received; and
    the last physical address is stored in the non-volatile memory when the counted number exceeds a predetermined threshold so that the last physical address can be obtained.

5. The method for managing the non-volatile memory according to claim 1
    wherein the last physical address is stored in the non-volatile memory periodically so that the last physical address can be obtained.

6. The method for managing the non-volatile memory according to claim 1, wherein if the data being stored in the corresponding data area is determined as invalid, the step of producing the mapping table comprises:
    reading a mapping table from the non-volatile memory; and
    correcting the mapping table according the assistant information.

7. A non-transitory computer readable medium storing computer executable data, which comprises executing codes and when executed by an electronic device, causes the electronic device to perform the method for managing a non-volatile memory according to claim 1.

8. A non-volatile memory system, comprising:
    a non-volatile memory having a plurality of blocks, each block having a plurality of sub-blocks, each sub-block having a data area and a spare area; and
    a memory controller, for obtaining a last physical address, the last physical address corresponding to a first sub-block which is adjacent to a second sub-block where data is latest stored, a first block having the first sub-block;
    wherein the memory controller is further for determining the validity of data being stored in each sub-block of at least one block, the at least one block comprising at least one block of the first block and the neighboring blocks of the first block, and for producing a mapping table according to the result of determining, wherein the memory controller determines the validity of data by scanning an assistant information being stored in the corresponding spare area when a command for sequentially writing the non-volatile memory is received by the memory controller to identify a sequence of sub-blocks in which identical assistant information are stored, and determines the validity of data being stored in the corresponding data area according to the assistant information, wherein the assistant information of each sub-block comprises a sequential length, the sequential length indicates the length of data being sequentially stored in a portion of sub-blocks, and for the sequence of sub-blocks, the memory controller determines the validity of data by comparing a length of the sequence of sub-blocks and the sequential length which is stored in one of the corresponding spare areas when determining the validity of the data.

9. The system according to claim 8, wherein the assistant information of each sub-block comprises a time mark, the time mark indicates the order of data being stored in each sub-block, and the memory controller is further for obtaining a last time mark, the last time mark indicating the order of data being stored in the first sub-block of the last physical address; wherein when determining the validity of data, for each sub-block of the at least one block, the memory controller determines the validity of data stored in the corresponding data area by comparing the last time mark and the time mark.

10. The system according to claim 8, wherein the memory controller stores the last physical address in the non-volatile memory when a command for powering off the non-volatile memory is received so that the last physical address can be obtained by the memory controller after the non-volatile memory is powering on.

11. The system according to claim 8, wherein the memory controller counts a number when a command for writing the non-volatile memory is received; and stores the last physical address in the non-violate memory when the counted number exceeds a predetermined threshold so that the last physical address can be obtained by the memory controller.

12. The system according to claim 8, wherein the memory controller stores the last physical address in the non-volatile memory periodically so that the last physical address can be obtained by the memory controller.

13. The system according to claim 8, wherein if the data being stored in the corresponding data area is determined as invalid, the memory controller reads a mapping table from the non-volatile memory and corrects the mapping table according the assistant information when producing the mapping table.

* * * * *